United States Patent [19]
Davidson

[11] 3,895,540
[45] July 22, 1975

[54] SPEED AND/OR DIRECTION CHANGE MEANS

[76] Inventor: Robert Davidson, Hadlow, No. 4 R.D., Timaru, New Zealand

[22] Filed: Dec. 26, 1973

[21] Appl. No.: 427,556

[30] Foreign Application Priority Data
Dec. 27, 1972 New Zealand................. 167927

[52] U.S. Cl. ................. 74/800; 74/60; 74/18.1
[51] Int. Cl. ...... F16h 1/34; F16h 23/00; F16j 15/52
[58] Field of Search ................. 74/800, 60, 18.1

[56] References Cited
UNITED STATES PATENTS

| | | | |
|---|---|---|---|
| 1,611,981 | 12/1926 | Amberg | 74/800 |
| 2,699,690 | 1/1955 | Kobler | 74/800 |
| 2,821,063 | 1/1958 | Sundt | 74/800 X |

FOREIGN PATENTS OR APPLICATIONS

| | | | |
|---|---|---|---|
| 139,327 | 11/1950 | Australia | 74/800 |
| 620,214 | 5/1961 | Italy | 74/800 |
| 952,789 | 3/1964 | United Kingdom | 74/800 |
| 1,168,381 | 10/1969 | United Kingdom | 74/800 |

Primary Examiner—Samuel Scott
Assistant Examiner—P. S. Lall
Attorney, Agent, or Firm—Toren, McGeady and Stanger

[57] ABSTRACT

A nutation drive apparatus wherein the nutator is prevented from rotating or is allowed to undergo controlled rotation in one direction during operation of the apparatus by means of simultaneous nutative contact with two rotors or stators or by restraining means acting on the central plane of nutation of the nutator. The nutator may make contact with the rotor(s) or stator(s) by means of friction-drive surfaces and the position of the centre of nutation which remains stationary during nutation may be varied relative to the rotor(s) or stator(s).

15 Claims, 8 Drawing Figures

PATENTED JUL 22 1975 3,895,540

SHEET 2

SPEED AND/OR DIRECTION CHANGE MEANS

SUMMARY OF THE INVENTION

The invention relates to speed and/or direction change means, in particular to means for securing a speed differential and/or directional difference between a driving body and a body driven thereby.

One object of the invention consists in the provision of speed change means to enable a rotatable body to be driven at a desired rate of rotation relative to the rate of movement of a body driving the rotatable body.

Another object of the invention consists in the provision of speed change means to enable a rotatable body to be driven at a variable rate of rotation relative to the rate of movement of a body driving the rotatable body.

Yet another object of the invention consists in the provision of direction change means to enable a rotatable body to be rotatably driven in the opposite direction to the direction of circular movement of a body driving the rotatable body.

Other objects and advantages of the invention will be apparent from the following description.

According to the invention, speed and/or direction change means comprises, in combination, a wobbling member adapted for orderly cyclic wobbling and having a contact surface; means for imparting an orderly cyclic wobbling as hereinafter defined to the wobbling member; and a rotor which has a contact surface and which is rotatably disposed relative to the wobbling member so that under cyclic wobbling of the wobbling member the contact surface of the rotor is progressively engaged by the contact surface of the wobbling member at a circularly moving locus of contact.

"Orderly cyclic wobbling motion" of the wobbling member means a circular wobble about a stationary point, hereinafter called the "wobble centre", such that every point in the wobbling member except the wobble centre where the same lies in the wobbling member, partakes of a reciprocating motion to the same amount as but in the opposite direction to another point lying equidistantly from the wobble centre on a straight line passing through the first-mentioned point and the wobble centre. The applicant will also use the expression "wobble plane" to denote a plane on which the wobble centre lies, the plane partaking of the orderly cyclic wobbling motion such that the turning points of the reciprocating motion of any point thereon are disposed equidistantly from the wobble centre and from the axis of rotation of the orderly cyclic wobbling motion. The wobble centre should advantageously lie on the axis of rotation of the rotor, and preferably on the axis of rotation of a rotating means as hereinafter described. The applicant has found that it is the behaviour of a point on the wobble plane during said cyclic wobbling of the wobbling member which is crucial to the control of the speed change means, and, in this connection, two aspects of the invention may be distinguished.

In the first of these two aspects of the invention, every point on the wobble plane except the wobble centre moves during wobbling of the wobbling member, through an arc having its centre at the wobble centre and being disposed parallel with the axis of rotation of the rotor. This may be achieved by fixing a part of the wobbling member which lies on the wobble plane against rotational movement about the axis of rotation of the rotor relative to a body, base, mounting means or the like of the apparatus.

In the second of the two aspects, every point on the wobble plane except the wobble centre moves, during wobbling of the wobbling member, in a path having the form of a sine wave, progressively moving around the axis of rotation of the rotor. This may be achieved by varying the apparatus described in connection with the first aspect of the invention to the extend that a controlled rotation of the wobbling member about the axis of rotation of the rotor is permitted.

The common feature of the two aspects of the invention is that the orderly cyclic wobbling motion is further to be understood not to include any reciprocating or hesitating rotary motion of the wobbling member about the axis of rotation of the rotor: the wobbling member either partakes of no rotary movement at all about the axis, or rotates evenly in one direction thereabout while it is undergoing orderly cyclic wobbling in one direction. The applicant has found that it is not necessary for the performance of the invention that the contact surface of the rotor move in a sinusoidal or other path partaking of rotational movement, and that the speed change means can be operated at its greatest efficiency by mechanically blocking the wobbling member against rotation about the axis of rotation of the rotor; thus the wobbling member can be, for example, a one-piece rigid member of discoid shape having location means extending outwardly from its rim by means of which it can be prevented from so rotating. Such location means may be studs slidably engaged with a body, base or mounting means of the apparatus, and preferably located on the wobble plane.

As the wobbling member undergoes orderly cyclic wobbling motion, the area of contact of the two contact surfaces moves in a circular path on each contact surface. The two circumferences of the circles thus described are different, that on the contact surface of the wobbling member being the greater. During the orderly cyclic wobbling motion the wobbling member and the rotor rotate relative to each other, the distance of rotational movement of any point on either contact surface within the contact area being equal to the difference between the two circumferences at that point. One or both of the rotor and the wobbling member may be permitted to rotate relative to base, frame or mounting means of the speed change means.

The means for imparting an orderly, cyclic wobbling to the wobbling member may be rotating, and preferably each complete wobble of the wobbling member is accomplished in each revolution of the rotating means.

Preferably, also, the rotor is co-axial with the rotating means.

The contact surface of the wobbling member may lie in the wobble plane, or may be offset from it in which case it may be planar or not planar. It has been found that, for ideal efficiency in the transfer of kinetic energy between the rotor and the wobbling member, at any given instant all contact between the two contact surfaces should take place on a straight line passing through the wobble centre or on a single real or notional conical surface having the wobble centre at its apex. If contact not conforming to these conditions takes place, for example where the contact surfaces are planar and their plane does not pass through the wobble centre, it contains an element of sliding which may be used to advantage as will hereinafter appear.

As the rate of relative rotation of the rotor and the wobbling member is dependent on the difference between the two circumferences hereinbefore defined, it will be determined by any factors which affect this difference. These include the amount of angular movement of the wobble plane about the wobble centre during wobbling of the wobbling member, and the angle formed between the axis of rotation of the rotor and a straight line passing through the wobble centre and any point of non-sliding contact between the two contact surfaces.

Preferably, the wobbling member is provided on one side thereof with its contact surface and adapted on an opposite side thereof to be engaged by the rotating means.

Preferably, also, the rotating means has at least an annular surface or surfaces arranged in annular relationship adapted to engage the opposite side of the wobbling member, the surface or arrangement of surfaces being disposed in an inclined plane relative to the axis of rotation of the rotating means, the amount of inclination of the plane relative to the axis determining the amount of travel in reciprocation of each point on the wobble plane of the wobbling member during each complete cyclic wobble thereof.

The desirable interengagement of the two contact surfaces may be effected by a frictional face or faces, or by teeth or any other suitable means. Where teeth are used, for maximum efficiency and durability it is desirable to have all of the contacting surfaces thereof convergent towards the wobble centre. Where a frictional face of facings are used, however, their ability to make the sliding contact hereinbefore described may be utilized to provide a convenient means of altering the rate of relative rotation of the rotor and the wobbling member by altering the angle between the axis of rotation of the rotor and a straight line passing through the wobbling centre and a point of non-sliding contact of the two surfaces. This may be achieved simply by moving the wobble centre closer to or further from the contact surface of the rotor and may be done while the apparatus is in operation, for example, by moving a bearing supporting the wobbling member along a shaft which is co-axial with the rotor without moving the wobbling member itself, the bearing being slidably engaged in the wobbling member. Sliding contact may be minimized or eliminated altogether by making one or both of the contact surfaces convexly curved so that their contact area approaches a point.

BRIEF DESCRIPTION OF THE DRAWING

In order that this invention may be clearly understood and readily carried into effect, several embodiments thereof will now be described by way of example only, with reference to the accompanying drawings wherein.

DETAILED DESCRIPTION OF THE INVENTION

Figure 1:
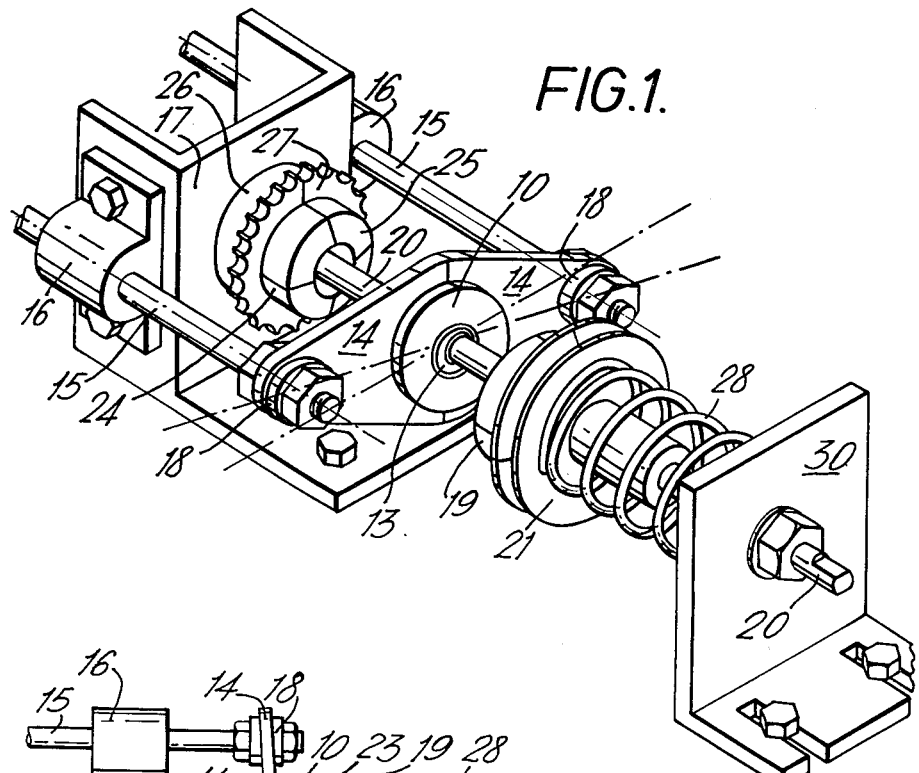
FIG. 1 is an oblique view of a transmission means in a loosely assembled condition, as provided in a first embodiment of the invention.
Figure 2:
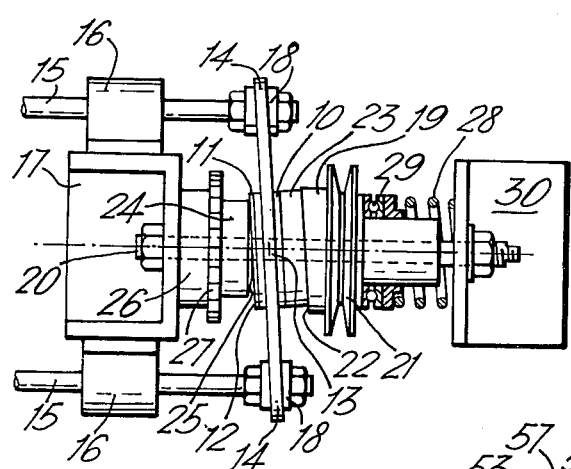
FIG. 2 is a partially sectioned plan view of the transmission means of FIG. 1 in a functional condition.

In a first embodiment of the invention, the wobbling member 10 includes a circular metal plate having on one planar face thereof a lamination 11 of a material possessing high frictional properties. The contact surface 12 of the wobbling member consists of an annular portion of the outer face of the frictional material lamination of the plate.

The plate is formed with an axial bore 13 therethrough. The plate is secured against rotation on the shaft by the provision of two arms 14 extending radially therefrom, the arms each being provided with a ball-joint 18 which is fixedly engaged with a rod 15 slidable longitudinally parallel to a shaft 20 through guides 16 rigidly secured to a base member 17 of the device. Thus, the wobbling member can be tilted about the shaft, but cannot rotate relative to the base member.

The means for cyclicly wobbling the plate consists of a sleeve 19 disposed on one side of the plate opposite to the side having the lamination and rotatable about the shaft 20 which extends through the axial bore 13 of the plate and which is threadedly secured to the base member 17. The sleeve 19 is formed integrally with a pulley 21 which is rotatably mounted on the shaft 20. The sleeve is formed at its end adjacent to the plate with an inclined face 22; the sleeve being disposed on the shaft so that its inclined face is engaged with the adjacent face of the plate via a thrust bearing 23, located concentrically about the axial bore 13.

The shaft is formed into the ball part of a ball and socket joint (not shown) where the plate is engaged therewith; the axial bore of the plate having a portion formed into the socket part of the joint. The centre of this ball joint lies on a straight line connecting the centres of the two ball joints 18, and this line lies in the wobble plane as herein defined of the wobbling member. Thus, the plate has an ability to wobble about the shaft without sliding longitudinally thereon.

Under rotation of the pulley the plate is circularly wobbled by the inclined face of the sleeve about a point or centre lying on the longitudinal axis of the shaft in the centre of the ball and socket joint thereon and equidistantly from the circumference of the annular contact surface on the outer face of the frictional material lamination of the plate, such that in each revolution of the pulley and sleeve any point except the wobble centre on the wobble plane of the wobbling member undergoes one reciprocating harmonic movement parallel to the axis of the shaft and in the opposite direction to a diametrically opposite point on the wobble plane. The length of that movement is proportional to the angle of inclination of the plate on the shaft as controlled by the inclination of the inclined face of the sleeve, and the position of the ball joint on the shaft 20 relative thereto.

The rotor consists of a cylindrical body 24 having at one end thereof a convexly curved annular face 25 and at its other end a drive wheel 27 such as a sprocket, gear or pulley. The rotor is rotatably mounted on a bearing (not shown) on the shaft 20 adjacent to the frictional material lamination of the plate, and disposed so that under circular wobbling of the plate the annular face 25 of the cylindrical body is frictionally engaged, progressively in a circular direction, by the contact surface of the plate at a circularly shifting point on each surface. The plate and the cylindrical body are maintained in frictional engagement by means of a thrust bearing 26 acting against the drive wheel of the rotor, and a spring 28 acting on the pulley 21 through a thrust beaering 29. The pressure of contact of the rotor and the wobbling member may be adjusted by movement of a base portion 30 of the shaft 20.

The portion and area of the outer face 12 of the frictional material lamination of the plate bearing the contact surface thereof is determined by the angle of the inclined face of the sleeve which affects the angles that the planes of the faces of the plate can assume relative to the axis of the shaft, and the location of the wobbling centre of the plate. The interrelationship of these factors will be obvious from the foregoing discussion.

Since the contact surface 12 of the plate is in frictional engagement with the annular face 25 of the rotor, it supplies torque to the annular face to compensate for the aforementioned circumferential difference by relative rotation of the plate and the rotor. As the plate is secured against rotation relative to said base member by the rods 15, the rotor alone is capable of movement relative thereto and is therefore rotated during each complete circular wobble of the plate, i.e. each complete reciprocation of a point on the contact surface 12 of the plate under circular wobbling thereof, through a distance dependent on the difference between the circumferences, the direction of rotation of the driven member being opposite to the circular direction in which the plate is being wobbled i.e. the direction of rotation of the pulley 21 and sleeve.

As this circumferential difference depends partly on the angle between the axis of rotation of the rotor in this case the shaft 20, and a line subtended from the wobble centre of the wobbling member to a given point of contact of the two contact surfaces 12 and 25, the rate of relative rotation of the pulley 21 and the rotor may be varied by varying the position of the wobble centre on the shaft with consequent alteration of the pitch of wobble of the wobbling member. This is achievable by sliding the shaft longitudinally through the rotor.

Alternatively, the rate of relative rotation may be varied by altering the amount of reciprocal movement of the wobble plane, by substituting a sleeve having a different profile of its inclined face.

The rotatable means for circularly wobbling the wobbling member can be rotated in either direction for correspondingly opposite rotation of the driven member.

In a preferred variant of this embodiment of the invention, the socket of the ball and socket joint is slidably engaged in the wobbling member so that the shaft can be moved longitudinally without moving the wobbling member with it. By this means the wobble centre can be moved relative to the rotor, thus providing a more convenient means of varying the rate of relative rotation of the wobbling member and the rotor.

In a second embodiment (not shown in the drawings) of the invention, the wobbling member includes a circular metal plate whereby the contact surface is constituted by an annular portion of the plate facing the rotor. The plate is formed with an axial bore therethrough having an enlarged portion between the centre of the bore and the other face of the plate. The outer race of a concentrically raced ball bearing is partially contained and slidably engaged in the said enlarged portion of the bore, and the inner race of the bearing is mounted on a shaft against a stop, the diameter of the shaft being less than that of the axial bore of the plate. Thus the bearing serves as a universal joint locating the plate on the shaft, whereby the plate is angularly movable on the shaft about a point lying axially central of the bearing and on the plane of the driving surface of the plate, the point constituting the wobbling centre for the plate.

The plate is secured against rotation on the shaft by means of two diameterically opposite bores in the plate parallel to said axial bore and two lugs rigidly secured to a base member or housing which are receivable into the two bores.

The shaft is slidably and rotatably engaged at its ends in the base member or housing by means of roller bearings. The means for wobbling the plate comprises two sleeves disposed one on each side of the plate and retained by keys on the shaft. Each sleeve is formed at its end adjacent to the plate with an inclined face, the sleeves being disposed on the shaft so that their inclined faces are complementary and each engaged with the plate by means of a thrust bearing.

The rotor consists of a drive wheel having at one end thereof a peripheral flange, the outer face of which has a lamination of frictional material, the drive wheel being formed with an axial bore therethrough and rotatably mounted on the shaft by means of bearings. The other end of the drive wheel abuts a thrust bearing on the shaft acting against the adjacent interior face of the base member or housing. The outer face of the lamination forms the contact surface for the rotor.

The rotor is disposed on the shaft so that the contact surface thereof is frictionally engaged, progressively in a circular direction, by the contact surface of the plate at a circularly moving point on the surfaces, under circular wobbling of the plate, such that in each complete circular wobble of the plate through each revolution of the sleeve and pulley on the shaft, the rotor is rotated relative to the base member or housing in the opposite direction by an amount determined by the difference between the two circumferences hereinbefore described.

If so desired the frictional engagement of the contact surfaces of the apparatus of the first and second embodiments hereinbefore described may be substituted for by a toothed drive, in which case the surfaces are each constituted by a plurality of radially extending teeth, the number of teeth present in each surface being proportional to the ratio of speed change as determined by the location of the wobbling centre of the driving member and the travel in reciprocation of any point on the circumference of the driving surface of the driving member in each complete circular wobble thereof as aforesaid.

Figure 4:
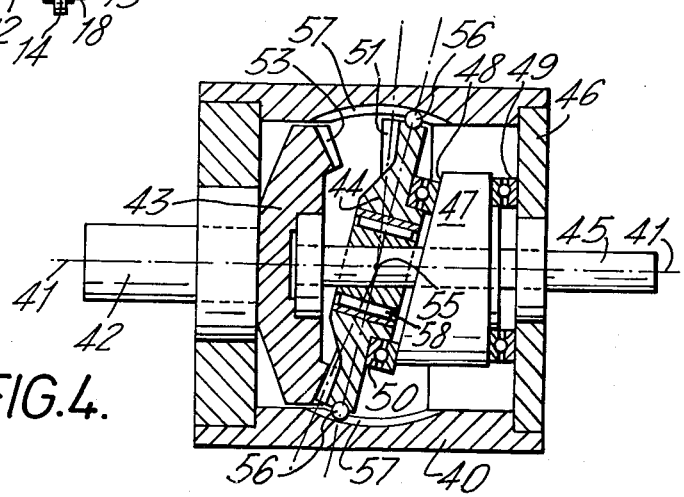
FIG. 4 is an axial section of the transmission means of FIG. 3.
Figure 3:
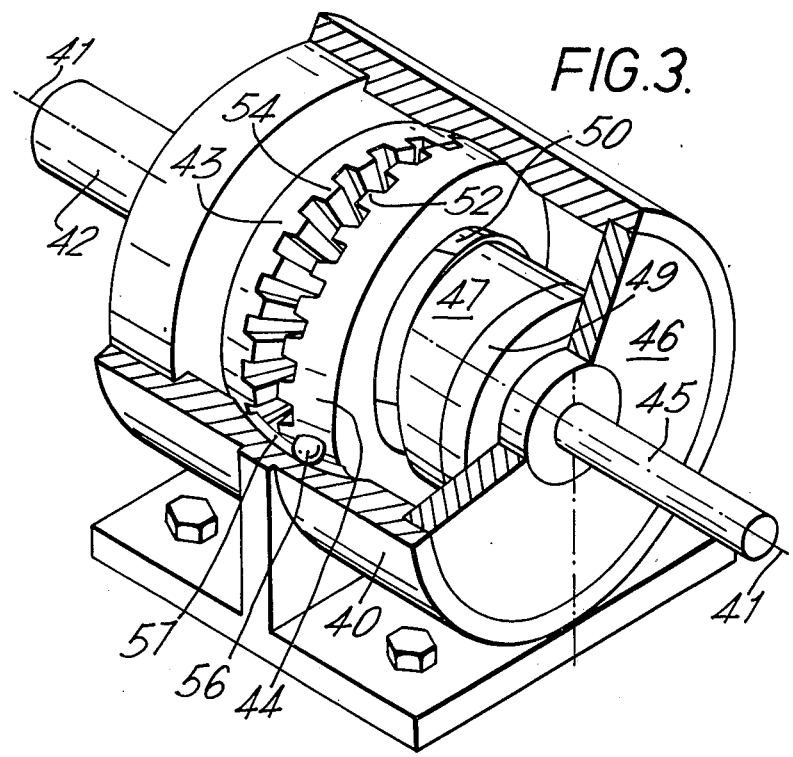
FIG. 3 is a partially sectioned oblique view of a transmission means provided in a third embodiment of the invention.

In a third embodiment of the invention seen in FIGS. 3 and 4, a transmission means is housed in a cylindrical casing 40 having one of two rotatable shafts extending through each end, the shafts having a common axis 41 of rotation. One shaft 42 is rigidly and concentrically affixed to a rotor 43 which is rotatable within the housing.

A wobbling member 44 is mounted on the other shaft 45 by means of an inclined bearing 58, being rotatable about the shaft and able to be wobbled about it. Between the wobbling member and the end 46 of the casing through which the shaft 45 extends is a sleeve 47 which is rigidly secured to the shaft 45 by a key (not shown). The sleeve has an inclined face 48 at the end of its closest to the wobbling member, the other end of the sleeve being normal to the axis of rotation of the shaft 45 and spaced from the end 46 of the casing by a thrust bearing 49.

The inclined face 48 of the sleeve is planar and is pressed against one side of the wobbling member, through a second thrust bearing 50, so that, when rotated about the axis 41, it can co-operate with the bearing 58 to impart an orderly cyclic wobbling motion as hereinbefore described to the wobbling member.

The wobbling member 44 is a circular member having, on a side opposite to that acted on by the sleeve, an annular contact face 51 formed with a plurality of teeth 52 radially disposed relative to the axis 41. The rotor 43 is similarly provided with an annular contact surface 53 with a plurality of radially disposed teeth 54. The two contact surfaces are face to face by virtue of the common axis 41 of the two shafts, and the sleeve 47 ensures that the contact surfaces are in constant engagement at a circularly moving common radius as the wobbling member is wobbled. The line of contact is always necessarily such as to pass through the wobble centre 55 of the wobbling member, the angle of this line relative to the axis 41, in part, determining the relative rotation of the rotor and the wobbling member as the shaft 45 rotates.

The wobbling member is prevented from rotating relative to the casing by a plurality of studs 56 extending radially outwardly from the circumferential edge surface thereof, each stud being received into arcuate slots 57 in the casing. The centres of the studs and the wobble centre all lie on the wobble plane as herein defined.

Figure 5:
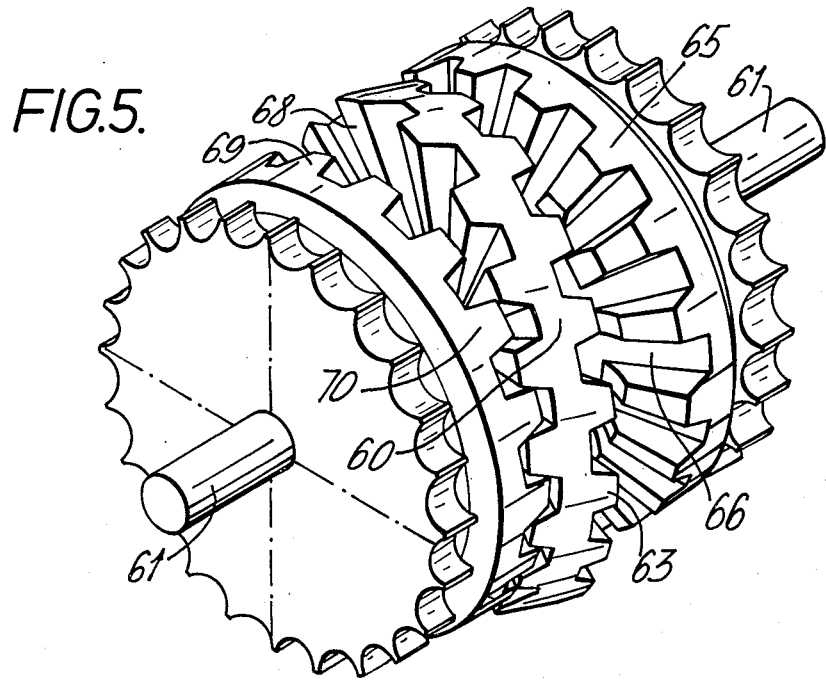
FIG. 5 is a partially sectioned oblique view of a part of a transmission means provided in a fourth embodiment of the invention.
Figure 6:
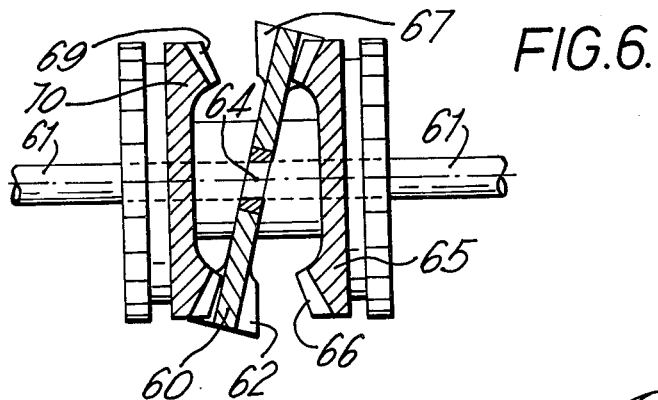
FIG. 6 is an axial section of the part of a transmission means of FIG. 5.

In a fourth embodiment of the invention, as illustrated in FIGS. 5 and 6, a wobbling member 60 consists of a circular plate having an axial bore and mounted on a shaft 61 extending through the bore by means of bearings as described in the foregoing embodiments of the invention or by other suitable means, such that the plate is rotatable and angularly movable on the shaft. The means for circularly wobbling the plate may be constructed, arranged and adapted to operate substantially as described in the said foregoing embodiments of the invention. The means shown in FIG. 6 are sleeves of the type used in the second embodiment hereinbefore described.

A first contact surface 62 of the plate is constituted by a ring of radially extending teeth 63 arranged so that the wobble centre 64 of the plate lies at the point of intersection of all radii subtended parallel to the surfaces constituted by the bases and crowns of the teeth, and equidistantly therefrom, the wobble centre thus being located at the intersection of the axis of rotation of the shaft by a radius subtended through the inner and outer circumferences of one contact surface 62 of the plate. The angle of the radius relative to the axis in part determines the rate of relative rotation of the plate and a first rotor 65 which determines the number of teeth required for the first contact surface 62 of the plate and a corresponding contact surface 66 of the rotor.

On the side of the plate opposite to the side having the first contact surface 62 there is provided a second contact surface 67 constituted by the same arrangement of teeth 68 as the first contact surface 62. The teeth of the second contact surface 67 of the plate are disposed in engagement with a ring of radially-extending teeth 69 of a second rotor 70 which is similar to the first rotor 65.

Under circular wobbling of the plate, the two rotors tend to rotate in the opposite direction to the direction of cyclic wobbling plate and use of this pnenomonen may be made to provide variable speed reduction means by placing one or both rotors under variable loading against such rotation. It will be obvious that this embodiment of the invention may be used as a differential speed change means.

Modifications of this embodiment of the invention may employ only one rotor, with other means of permitting controlled rotation of the wobbling member relative to a base member, housing, or other reference point. Such means may, for example, be a frictional brake acting on the wobbling member to discourage such rotation thereof, and may be employed in any of the embodiments of this invention herein described. By such means as this, the invention can provide an infinitely variable speed change mechanism. Flat or convexly curved friction surfaces may replace the toothed contact surfaces, as in the first and second embodiments hereinbefore described.

Figure 7:
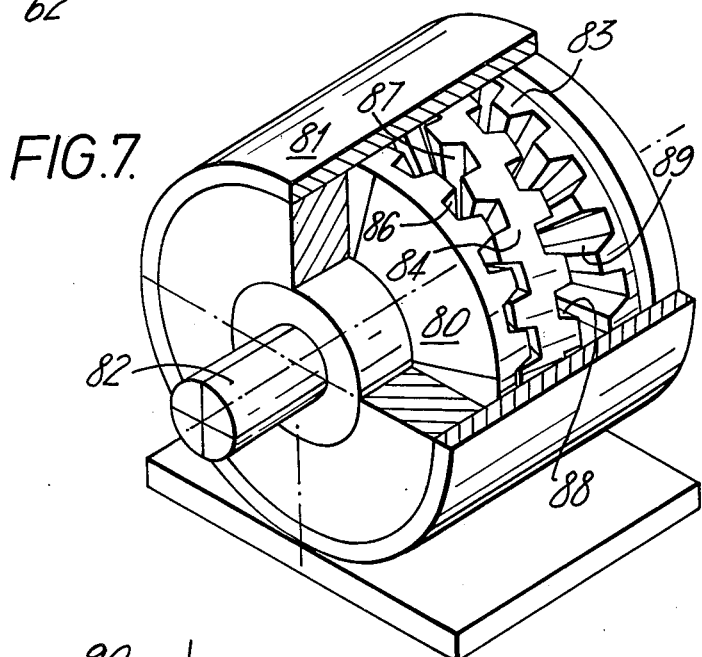
FIG. 7 is a partially sectioned oblique view of a transmission means provided in a fifth embodiment of the invention.
Figure 8:
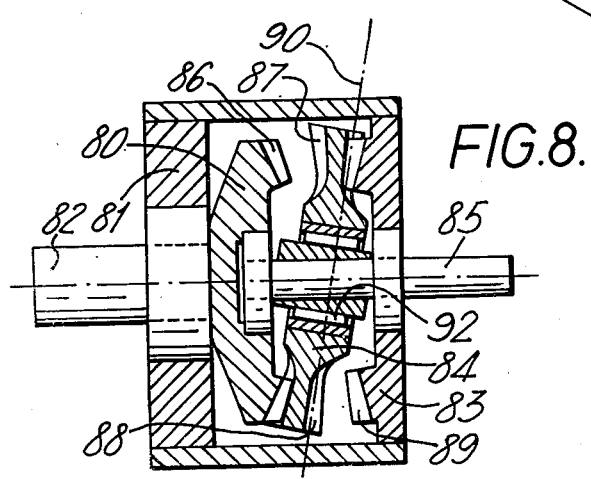
FIG. 8 is an axial section of the transmission means of FIG. 7

A fifth embodiment of the invention, illustrated in FIGS. 7 and 8, is a particular instance of the general form described with reference to FIGS. 5 and 6. In this embodiment, a rotor 80 is rotatable within a housing 81 on a shaft 82 while a stator 83 is formed integrally with one end of the housing. The wobbling member 84 is disposed between the rotor and the stator on a shaft 85 so as to engage them both at a spacing of 180°. The mounting of the wobbling member 84 on its shaft 85 is by means of an inclined roller bearing 92, no sleeve being required to provide the wobbling motion of the wobbling member when the shaft 85 is turned.

A contact surface 86 of the rotor 80, and a first contact surface 87 of the wobbling member engaged therewith, are provided with teeth and adapted to engage in the manner already described with reference to the third embodiment of the invention.

A second contact surface 88 of the wobbling member, which engages with the contact surface 89 of the stator, is also provided with teeth. The effective contact surface, however, lies behind the wobble plane of the wobbling member indicated by a line 90. As a result, during orderly cyclic wobbling of the wobbling member, the wobbling member itself rotates within the housing in the same direction as its cyclic wobble but at a different speed from the rotation in the opposite direction of the rotor. Thus, in this embodiment of the invention, by a principle of "double reduction", a particularly great or small reduction in rotational speed may be obtained without the use of intermediate gears by simple addition and subtraction of the movements of the rotor and the wobbling member within the housing.

In this embodiment of the invention, as in all of its forms, the rate of relative rotation of the wobbling member and any rotor or stator with which it is engaged is dependent on the difference between the interacting circumferences of the members which in turn is a function of the amount of reciprocal movement of the wobble plane of the wobbling member, and the relative disposition of the wobble centre and the point or line of true contact of the wobbling member with the rotor or stator.

The number of teeth on each contact surface, wherever teeth are used, must therefore be calculated to conform to this difference — the proportionate number of teeth on two engaging contact surfaces should, for efficient working of the apparatus, be the same as the ratio of their interacting circumferences.

An embodiment of the invention found to have particularly advantageous properties is a modification of the third embodiment hereinbefore described (FIGS. 3 and 4) wherein the studs 56 extend through the casing 40 so as to be engageable with rods or other mechanical linkage, and the casing 40 is cylindrical and provided with rotation drive means about its circumference, for example a toothed cog. There are thus four input/output means — the shaft 45 of the wobbling member, the shaft 42 of the rotor, the rotation of the casing 40, and reciprocation of the studs 56 — and it has been found that any one of these may be used as an input or output of motion to or from the apparatus. The apparatus thus can convert reciprocating motion into rotational motion of two speeds (using the casing as the stationary reference point and reciprocating the studs 56 as the input), can convert rotary motion of the shaft 42 or the casing 40 into faster rotary motion (using the shaft 45 as the rotary output) and reciprocating motion simultaneously, can convert rotary motion of the shaft 45 into slower rotary motion of the shaft 42 or the casing 40 and reciprocating motion of the studs 56 simultaneously, can be used to provide an infinitely or otherwise variable speed change means when either of the shafts is used as the input means by allowed controlled rotation of the casing, and can be used as a rotation speed differentional means using potentially both of the shafts and the casing.

I claim:

1. A speed and/or direction change means comprising, in combination, a wobbling member arranged for orderly cyclic wobbling about a wobble center and having a contact surface, means for imparting an orderly cyclic wobbling motion to the wobbling member, and a rotor having a contact surface, said rotor being rotatable relative to said wobbling member so that, under the orderly cyclic wobbling of said wobbling member, the contact surface of the rotor is progressively engaged by the contact surface of said wobbling member at a circularly moving locus of contact, said wobble center lying in the axis of rotation of said rotor relative to said wobbling member, said imparting means comprising a shaft passing through the wobble center, and bearing means surrounding said shaft and wobble center, said bearing means slidably mounting said wobbling member for movement towards and away from the rotor along the axis of rotation of the rotor relative to the wobbling member.

2. A speed and/or direction change means according to claim 1, wherein said shaft is longitudinally slidable along said axis.

3. A speed and/or direction change means according to claim 2, wherein said imparting means includes a rotating means comprising at least one annular surface arranged in the form of a ring adapted to engage a side of said wobbling member opposite to the contact surface thereof, said rotating means further comprising a body having said annular surface at one end thereof coaxially mounted on said shaft.

4. A speed and/or direction change means according to claim 2, wherein said rotor is rotatably mounted on said shaft.

5. A speed and/or direction change means comprising, in combination, a wobbling member arranged for orderly cyclic wobbling about a wobble center and having a contact surface, means for imparting an orderly cyclic wobbling motion to the wobbling member, and a first rotor having a contact surface, said rotor being rotatable relative to said wobbling member so that, under the orderly cyclic wobbling of said wobbling member the contact surface of the rotor is progressively engaged by the contact surface of said wobbling member at a circularly moving locus of contact, said wobble center lying on the axis of rotation of said rotor relative to said wobbling member, and at least one of said contact surfaces is a frustum of a cone having its vertex at the wobble center.

6. A speed and/or direction change means comprising, in combination, a wobbling member arranged for orderly cyclic wobbling about a wobble center and having a contact surface, means for imparting an orderly cyclic wobbling motion to the wobbling member, and a first rotor having a contact surface, said rotor being rotatable relative to said wobbling member so that, under said orderly cyclic wobbling of the wobbling member, the contact surface of the rotor is progressively engaged by the contact surface of said wobbling member at a circularly moving locus of contact, said contact surface of said rotor being a continuous, convex surface and consisting of a frictional-drive material for contact with said contact surface of said wobbler to thereby drive said rotor in nonsliding contact.

7. The device according to claim 6, wherein said contact surface of said wobbler extends beyond the contact surface of said rotor in all directions extending radially outwardly on the wobble plane from said wobble center.

8. The device according to claim 6, wherein said contact surface of said wobbler is planar, flat and continuous, and consists of a frictional-drive material for contacting the frictional-drive material of said rotor.

9. A speed and/or direction change means according to claim 6, wherein said means for imparting an orderly cyclic wobbling comprises at least one annular surface arranged in the form of a ring engaging a side of said wobbling member opposite to the contact surface thereof, said surface being disposed in an inclined plane relative to the axis of rotation of said rotating means.

10. A speed and/or direction change means according to claim 9, further comprising a tubular sleeve wherein said annular surface is an end surface of said tubular sleeve which is disposed so as to press against said wobbling member.

11. A speed and/or direction change means comprising, in combination, a wobbling member adapted for orderly cyclic wobbling about a wobble center and having a contact surface, means for imparting an orderly cyclic wobbling motion to the wobbling member, and a first rotor having a contact surface, said rotor being rotatable relative to said wobbling member so that, under said orderly cyclic wobbling of the wobbling member, the contact surface of the rotor is progressively engaged by the contact surface of said wobbling member at a circularly moving locus of contact, wherein each of said contact surfaces comprises a plurality of contacting portions arranged such that, during orderly cyclic wobbling of said wobbling member, said contacting portions of said rotor are progressively engaged by the contacting portions of said wobbling member at a zone of contact describing a circle on each of said contact surfaces, said wobble center lying on the axis of rotation of said rotor relative to said wobbling member, said means for imparting an orderly cyclic wobbling comprising stud means extending outwardly from said wobbling member on the wobble plane, said stud means slidably engaging a body for fixing said wobbling member against rotation relative to said body, said imparting means also comprising driving means operatively connected to said stud means to reciprocate said stud means and wobble said wobbling member.

12. The device according to claim 11, wherein said body comprises a cylindrical element mounting said rotor and wobbling member therein, said driving means also capable of operative connection with said cylindrical element to rotate same for wobbling said wobbling member.

13. A speed and/or direction change means comprising, in combination, a wobbling member adapted for orderly cyclic wobbling about a wobble center and having a contact surface, means for imparting an orderly cyclic wobbling motion to the wobbling member, and a first rotor having a contact surface, said rotor being rotatable relative to said wobbling member so that, under said orderly cyclic wobbling of the wobbling member, the contact surface of the rotor is progressively engaged by the contact surface of said wobbling member at a circularly moving locus of contact, futher comprising a second rotor having a contact surface in direct engagement with a contact surface of said wobbling member, said rotor being coaxially mounted with said first rotor and lying at the opposite side of said wobbling member from said first rotor, said second rotor rotatable about the same axis as said first rotor, first means for rotatably mounting said first rotor, and second means for rotatable mounting said second rotor, said second means allowing rotation of said second rotor at a speed different from that of said first rotor.

14. The device according to claim 13, wherein the wobble center lies on the axis of rotation of said rotors, and said contact surfaces comprising teeth formed on said contact surfaces.

15. The device according to claim 14, wherein said teeth comprise driving faces convergent towards the wobble center.

* * * * *